US012015898B2

(12) United States Patent
Naiki et al.

(10) Patent No.: US 12,015,898 B2
(45) Date of Patent: Jun. 18, 2024

(54) TRANSDUCER AND DRIVING METHOD THEREOF, AND SYSTEM

(71) Applicant: ROHM CO., LTD., Kyoto (JP)

(72) Inventors: Takashi Naiki, Kyoto (JP); Tomohiro Date, Kyoto (JP); Noriyuki Shimoji, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 17/979,419

(22) Filed: Nov. 2, 2022

(65) Prior Publication Data

US 2023/0051555 A1 Feb. 16, 2023

Related U.S. Application Data

(63) Continuation of application No. PCT/JP2021/012219, filed on Mar. 24, 2021.

(30) Foreign Application Priority Data

May 20, 2020 (JP) ................................ 2020-088169

(51) Int. Cl.
*H04R 17/00* (2006.01)
*H04R 7/10* (2006.01)
(Continued)

(52) U.S. Cl.
CPC ............... *H04R 17/10* (2013.01); *H04R 7/10* (2013.01); *H04R 7/18* (2013.01)

(58) Field of Classification Search
CPC ...... H04R 17/00; H04R 17/005; H04R 17/02; H04R 17/025; H04R 2217/00; B06B 1/0625
See application file for complete search history.

(56) References Cited

U.S. PATENT DOCUMENTS 3,510,698 A * 5/1970 Massa .................... H04R 17/00 367/160
4,816,125 A * 3/1989 Muller ................. H04R 19/005 204/192.18
(Continued)

FOREIGN PATENT DOCUMENTS

DE 102016115260 B3 2/2018
GB 2444184 A * 5/2008 ............ G01H 11/08
(Continued)

OTHER PUBLICATIONS

International Search Report for PCT/JP2021/012219, mailed on May 11, 2021.

(Continued)

*Primary Examiner* — Ryan Robinson
(74) *Attorney, Agent, or Firm* — Rabin & Berdo, P.C.

(57) ABSTRACT

A transducer includes: a piezoelectric element; and a film body including a film support portion having a hollow portion, and a vibration film connected to the film support portion and displaceable in a film thickness direction, the film body having the piezoelectric element stacked over the vibration film. The piezoelectric element includes: a first stacked body having a first pair of electrodes and a first piezoelectric film sandwiched between the first pair of electrodes; and a second stacked body having a second pair of electrodes and a second piezoelectric film sandwiched between the second pair of electrodes, the second stacked body being separated from the first stacked body.

17 Claims, 4 Drawing Sheets

(51) Int. Cl.

| | |
|---|---|
| ***H04R 7/18*** | (2006.01) |
| ***H04R 17/10*** | (2006.01) |

(56) References Cited

U.S. PATENT DOCUMENTS

| | | | | |
|---|---|---|---|---|
| 5,122,993 | A * | 6/1992 | Hikita | B06B 1/0625 600/459 |
| 7,888,844 | B2 * | 2/2011 | Martin | B06B 1/0625 310/369 |
| 2009/0129611 | A1 * | 5/2009 | Leidl | H04R 17/02 381/173 |
| 2017/0111746 | A1 * | 4/2017 | Miyoshi | H10N 30/87 |
| 2018/0052042 | A1 | 2/2018 | Dehe et al. | |
| 2018/0117915 | A1 | 5/2018 | Takeuchi | |
| 2018/0139527 | A1 * | 5/2018 | Ogata | H04R 1/24 |
| 2018/0281021 | A1 | 10/2018 | Ashikaga | |
| 2020/0055088 | A1 * | 2/2020 | Okada | A61B 8/4483 |
| 2022/0013711 | A1 * | 1/2022 | Hur | H10N 30/03 |
| 2023/0347382 | A1 * | 11/2023 | Shaw | B06B 1/0625 |

FOREIGN PATENT DOCUMENTS

| | | | |
|---|---|---|---|
| JP | H06-121390 | A | 4/1994 |
| JP | H06-148154 | A | 5/1994 |
| JP | 2010-212968 | A | 9/2010 |
| JP | 2012-105170 | A | 5/2012 |
| JP | 2018-170592 | A | 11/2018 |

OTHER PUBLICATIONS

German Office Action dated Nov. 9, 2023, in the counterpart German patent application.

* cited by examiner

TRANSDUCER AND DRIVING METHOD THEREOF, AND SYSTEM

CROSS REFERENCE TO RELATED APPLICATIONS AND INCORPORATION BY REFERENCE

This is a continuation application (CA) of PCT Application No. PCT/JP2021/012219, filed on Mar. 24, 2021, which claims priority to Japan Patent Application No. P2020-088169 filed on May 20, 2020, and is based upon and claims the benefit of priority from prior Japan Patent Application No. P2020-088169 filed on May 20, 2020, and PCT Application No. PCT/JP2021/012219, filed on Mar. 24, 2021; the entire contents of each of which are incorporated herein by reference.

BACKGROUND OF THE INVENTION

Technical Field

The present embodiment relates to a transducer and a driving method thereof, and a system.

Background of the Invention

Conventionally, transducers for transmitting or receiving sound waves or ultrasonic waves have been known. A transducer is used, for example, as a speaker for transmitting a sound wave, and is mounted on an earphone or a wearable terminal.

For example, there is a sound generator suitable for an earphone. This sound generator includes a coil for generating a magnetic field, and a magnet for vibrating a diaphragm by interacting with the magnetic field generated by the coil.

In speakers using a coil and a magnet, it is necessary to pass a current to the coil in order to generate a magnetic field, and thus power consumption becomes high. Accordingly, speakers using a piezoelectric element, which is formed by sandwiching a piezoelectric film from both sides with a pair of electrodes, have attracted attention. Such speakers are manufactured using MEMS (micro-electro-mechanical systems), which is a semiconductor manufacturing technique that realizes microfabrication.

SUMMARY OF THE INVENTION

One aspect of the present embodiment provides a transducer capable of varying a resonant frequency of a vibration body. Another aspect of the present embodiment also provides a method of driving the transducer. In addition, another aspect of the present embodiment provides a system for adjusting the resonant frequency of the vibration body such that the vibration body is in a suitable state with high sensitivity.

DETAILED DESCRIPTION OF THE INVENTION

Figure 1:
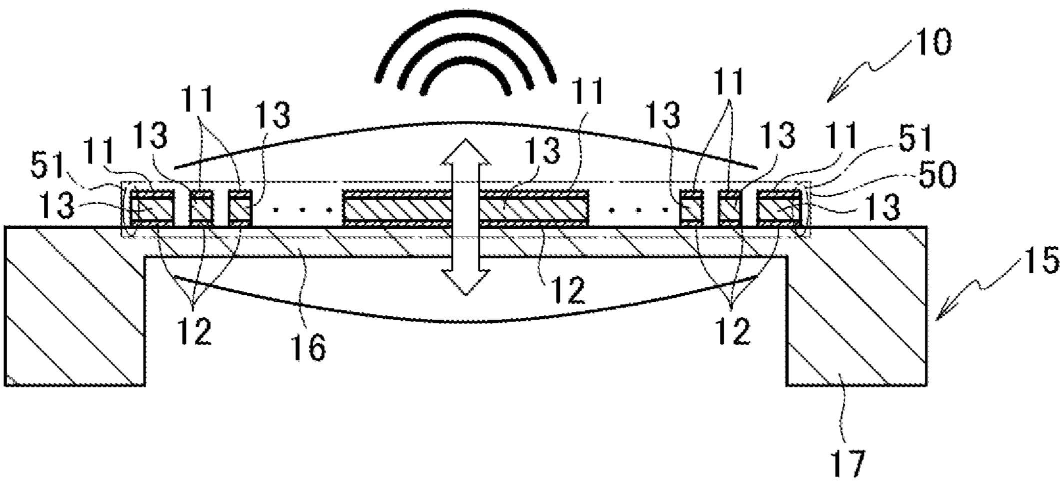
FIG. 1 is a cross-sectional view of a transducer according to a first embodiment.

Next, the present embodiment will be described with reference to the drawings. In the drawings described below, the same or similar parts are denoted by the same or similar numerals. However, it should be noted that the drawings are schematic, and the relationships between the thicknesses of each component and the plane dimension, etc. are different from the actual ones. Accordingly, the specific thicknesses and dimensions should be determined in consideration of the following description. Further, it is needless to say that portions having different dimensional relationships and ratios are included among the drawings.

In addition, the following embodiments illustrate devices and methods for embodying technical ideas, and do not specify the material, shape, structure, arrangement, etc. of each component. Various modifications can be made to the present embodiments in the claims.

One specific aspect of the present embodiments is as follows.

<1>

A transducer includes: a piezoelectric element; and a film body including a film support portion having a hollow portion, and a vibration film connected to the film support portion and displaceable in a film thickness direction, the film body having the piezoelectric element stacked over the vibration film. The piezoelectric element includes: a first stacked body having a first pair of electrodes and a first piezoelectric film sandwiched between the first pair of electrodes; and a second stacked body having a second pair of electrodes and a second piezoelectric film sandwiched between the second pair of electrodes, the second stacked body being separated from the first stacked body.

<2>

The transducer according to <1>, wherein the piezoelectric element further includes a third stacked body having a third pair of electrodes and a third piezoelectric film sandwiched between the third pair of electrodes, and the third stacked body is sandwiched between the first stacked body and the second stacked body, and is separated from the first stacked body and the second stacked body.

<3>

A transducer includes: a piezoelectric element; and a film body including a film support portion having a hollow portion, and a vibration film connected to the film support portion and displaceable in a film thickness direction, the film body having the piezoelectric element stacked over the vibration film. The piezoelectric element includes: a first electrode; a first stacked body having a first piezoelectric film and a second electrode; and a second stacked body having a second piezoelectric film and a third electrode, and separated from the first stacked body. The first piezoelectric film is sandwiched between the first electrode and the second electrode, and the second piezoelectric film is sandwiched between the first electrode and the third electrode.

<4>

The transducer according to <3>, wherein the first piezoelectric film and the second piezoelectric film are positioned over the first electrode.

<5>

The transducer according to <3> or <4>, wherein the piezoelectric element further includes a third stacked body having a third piezoelectric film and a fourth electrode, and the third stacked body is sandwiched between the first stacked body and the second stacked body, and is separated from the first stacked body and the second stacked body.

<6>

The transducer according to any one of <1> to <5>, wherein an end of the second stacked body has a region overlapping the film support portion when viewed from a direction normal to the vibration film.

<7>

The transducer according to any one of <1> to <6>, wherein the first stacked body is surrounded by the second stacked body.

<8>

A transducer includes: a piezoelectric element; and a film body including a film support portion having a hollow portion, and a vibration film connected to the film support portion and displaceable in a film thickness direction, the film body having the piezoelectric element stacked over the vibration film. The piezoelectric element includes: a first electrode; a second electrode; a piezoelectric film sandwiched between the first electrode and the second electrode; and a third electrode. The piezoelectric film is sandwiched between the first electrode and the third electrode, and the third electrode is separated from the second electrode.

<9>

The transducer according to <8>, wherein an end of the third stacked body has a region overlapping the film support portion when viewed from a direction normal to the vibration film.

<10>

The transducer according to <8> or <9>, wherein the vibration film is positioned over the first electrode.

<11>

The transducer according to any one of <8> to <10>, wherein the piezoelectric element further includes a fourth electrode, the piezoelectric film is sandwiched between the first electrode and the fourth electrode, and the fourth electrode is sandwiched between the second electrode and the third electrode, and is separated from the second electrode and the third electrode.

<12>

The transducer according to any one of <8> to <11>, wherein the second electrode is surrounded by the third electrode.

<13>

The transducer according to any one of <1> to <12>, wherein the vibration film has a double-sided beam shape.

<14>

The transducer according to any one of <1> to <13>, wherein the piezoelectric element has a function of changing a resonant frequency of a vibration body including the piezoelectric element and the film body.

<15>

A method of driving a transducer, the transducer including: a piezoelectric element; and a film body including a film support portion having a hollow portion, and a vibration film connected to the film support portion and displaceable in a film thickness direction, the film body having the piezoelectric element stacked over the vibration film. The piezoelectric element includes: a lower electrode; a piezoelectric film over the lower electrode; and a plurality of upper electrodes, which are separated from each other, over the piezoelectric film. An end of one of the plurality of upper electrodes has a first region closest to the film support portion, the piezoelectric element either applies a control voltage to an upper electrode in the first region, or opens the upper electrode, or opens the lower electrode, and the piezoelectric element further either applies a control voltage or a waveform voltage to the remaining upper electrodes independently, or opens the upper electrode, or opens the lower electrode, thereby changing a resonant frequency of a vibration body including the piezoelectric element and the film body.

<16>

The method of driving the transducer according to <15>, wherein the first region overlaps the film support portion when viewed from a direction normal to the vibration film, and a waveform voltage is applied to an upper electrode having a second region farthest from the first region.

<17>

The method of driving the transducer according to <16>, wherein an upper electrode in the second region is surrounded by an upper electrode in the first region.

<18>

The method of driving the transducer according to <16> or <17>, wherein the control voltage is applied to all of the upper electrodes sandwiched between an upper electrode having the control voltage applied thereto and closest from the second region, and an upper electrode in the first region.

<19>

The method of driving the transducer according to any one of <15> to <18>, wherein a plurality of piezoelectric films are provided in such a way as to be separated from each other.

<20>

The method of driving the transducer according <19>, wherein a plurality of lower electrodes are provided in such a way as to be separated from each other.

<21>

A system includes: a piezoelectric element; and a film body including a film support portion having a hollow portion, and a vibration film connected to the film support portion and displaceable in a film thickness direction, the film body having the piezoelectric element stacked over the vibration film. The piezoelectric element includes: a lower electrode; a piezoelectric film over the lower electrode;

and a plurality of upper electrodes, which are separated from each other, over the piezoelectric film. An end of one of the plurality of upper electrodes has a first region closest to the film support portion, the piezoelectric element either applies a control voltage to an upper electrode in the first region, or opens the upper electrode, or opens the lower electrode, or extracts a signal generated due to vibration of the film body, and in order to achieve the most efficient reception for an external signal, the piezoelectric element further either applies a control voltage to the remaining upper electrodes independently, or opens the upper electrode, or opens the lower electrode, or extracts a signal generated due to vibration of the film body.

<22>

The system according to <21>, wherein the first region overlaps the film support portion when viewed from a direction normal to the vibration film, and the signal generated due to vibration of the film body is extracted in the second region farthest from the first region.

<23>

The system according to <22>, wherein an upper electrode in the second region is surrounded by an upper electrode in the first region.

<24>

The system according to <22> or <23>, wherein the control voltage is applied to all of the upper electrodes sandwiched between an upper electrode having the control voltage applied thereto and closest from the second region, and an upper electrode in the first region.

<25>

The system according to any one of <21> to <24>, wherein a plurality of piezoelectric films are provided in such a way as to be separated from each other.

<26>

The system according to <25>, wherein a plurality of lower electrodes are provided in such a way as to be separated from each other.

First Embodiment

The configuration of the transducer according to the present embodiment will be described with reference to the drawings. As illustrated in FIG. 1, a transducer 10 according to the first embodiment is mainly configured of a piezoelectric element 50 and a film body 15. In the following description, although the up-and-down direction is defined with reference to the state of the transducer 10 illustrated in FIG. 1, it does not mean that the direction in which the transducer 10 is used is limited.

The piezoelectric element 50 includes a plurality of pairs of electrodes 11 and 12, and piezoelectric films 13 sandwiched between the pairs of electrodes 11 and 12. The pairs of electrodes 11 and 12 and the piezoelectric films 13 have a shape corresponding to the shape of a vibration film 16 described later, and have a circular shape in the examples illustrated in FIGS. 3 and 4 described later.

Each pair of electrodes 11 and 12 is formed using a thin film of a metal having conductivity, such as platinum, molybdenum, iridium, or titanium. One electrode 11 is positioned above the piezoelectric film 13, and is connected to an electrode pad which is a circuit pattern for applying a driving voltage to the electrode 11. The other electrode 12 is positioned below the piezoelectric film 13, and is connected to an electrode pad which is a circuit pattern for applying a driving voltage to the electrode 12.

The piezoelectric film 13 is made of, for example, lead zirconate titanate (PZT). The piezoelectric film 13 may be made of aluminum nitride (AlN), zinc oxide (ZnO), lead titanate ($PbTiO_3$), or the like, in addition to lead zirconate titanate.

The film body 15 includes the vibration film 16 and a film support portion 17. The film body 15 is made of, for example, silicon (Si). The vibration film 16 and the film support portion 17 are integrally formed by etching the back surface side of the film body 15.

The vibration film 16 is made of a thin film, and is configured to be displaceable in the film thickness direction, that is, in the direction normal to the vibration film 16 (the up-and-down direction in the page space of FIG. 1). The vibration film 16 has a substantially circular shape when observed from a plane parallel to the vibration film 16.

The film support portion 17 has a cylindrical inner peripheral surface forming a cavity (hollow portion). The vibration film 16 is connected to the inner peripheral surface of the film support portion 17 over the entire circumference such that the vibration film 16 is inscribed therein, and thus the circumference of the vibration film 16 is supported by the film support portion 17. The vibration film 16 is connected to the upper end side of the film support portion 17.

In addition, the film support portion 17 has a region overlapping an end 51 of the piezoelectric element 50 (electrode 11, electrode 12, and piezoelectric film 13) when viewed from a direction normal to the vibration film 16, and the vibration film 16 has a double-sided beam shape with both ends fixed by the film support portion 17. However, the vibration film 16 may have a cantilever shape protruding from the film support portion 17, in which the distal end of the vibration film 16 is formed as a free end. Further, the vibration film 16 may be annular and the outside of the annular vibration film 16 may be fixed by the film support portion 17, or the outside of the vibration film 16 may be fixed by the film support portion 17 and the vibration film 16 may have one or more holes. In the present specification, "end" refers to the patterned portion which is farthest from the center in each single direction.

In addition, the film support portion 17 need not overlap the end 51 of the piezoelectric element 50 when viewed from the direction normal to the vibration film 16 as long as the effect of the transducer according to the present embodiment described later is not inhibited. For example, the end of the film support portion 17 and the end 51 of the piezoelectric element may be aligned, or the end 51 of the piezoelectric element 50 may be positioned slightly toward the center side of the film support portion 17. When the end 51 of the piezoelectric element 50 is positioned toward the center from the film support portion 17, for example, the end 51 of the piezoelectric element 50 may be positioned toward the center by about 10 times the film thickness of the vibration film 16 from the end of the film support portion 17.

Figure 2:
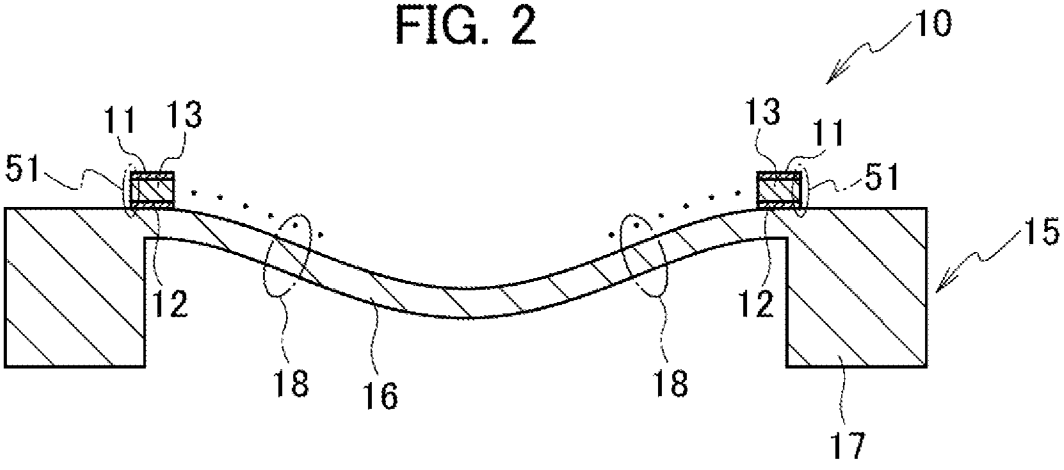
FIG. 2 is a cross-sectional view of a transducer during vibration of a vibration film.

Here, FIG. 2 illustrates a cross-sectional view around the region overlapping the end of the piezoelectric element 50 when viewed from the direction normal to the vibration film 16 during vibration of the vibration film 16. The vibration film 16 has an inflection point 18, and the end of the piezoelectric element 50 is arranged on the film support portion 17 side from the inflection point 18. With this arrangement, the periphery of the vibration film 16 can be effectively restrained by applying a control voltage. In addition, the end of the piezoelectric element 50 and the film support portion 17 need not overlap each other when viewed from the direction normal to the vibration film 16 as long as the above effect is not inhibited.

Figure 3:
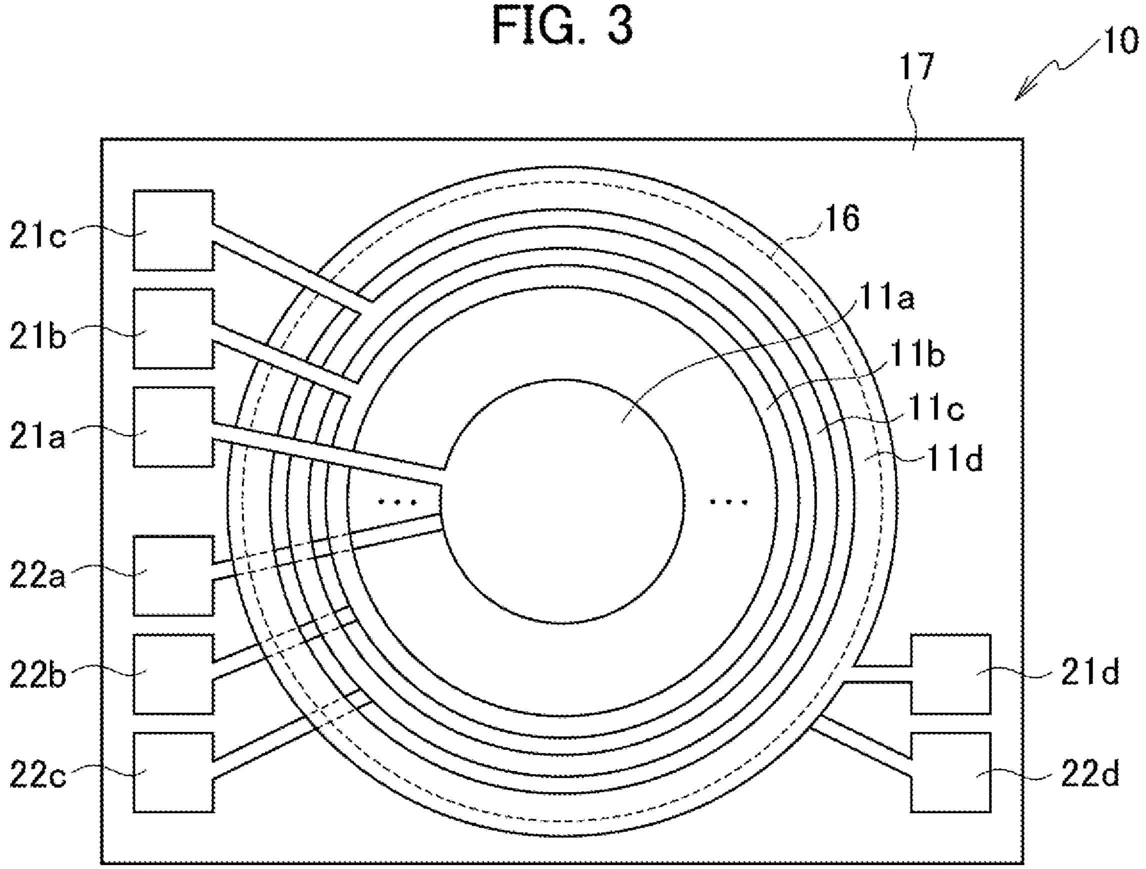
FIG. 3 is a top view of the transducer according to the first embodiment.
Figure 4:
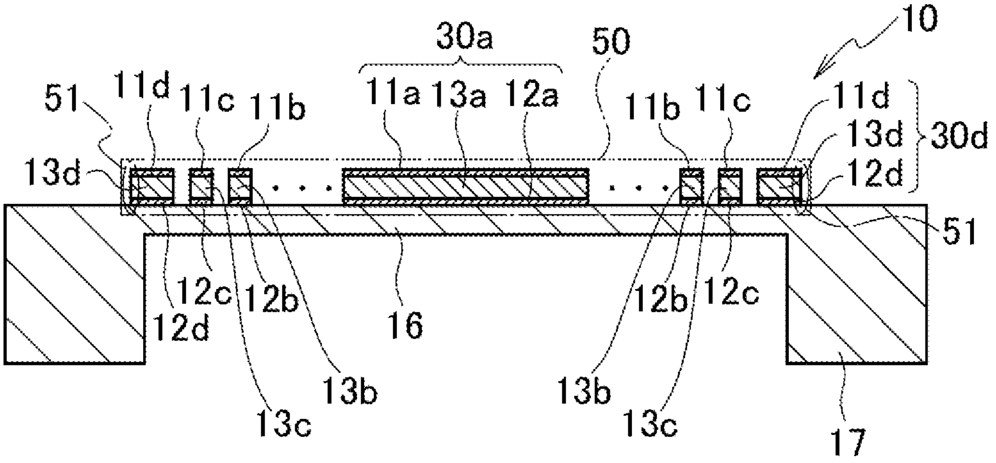
FIG. 4 is a cross-sectional view of the transducer according to the first embodiment.

The transducer according to the present embodiment will be described in more detail with reference to FIG. 3 and FIG. 4. The piezoelectric element 50 has a plurality of electrodes 11 (in the present embodiment, for example, upper electrodes 11*a*, 11*b*, 11*c* and 11*d*), a plurality of piezoelectric films 13 (in the present embodiment, for example, piezoelectric films 13*a*, 13*b*, 13*c* and 13*d*), and a plurality of electrodes 12 (in the present embodiment, for example, lower electrodes 12*a*, 12*b*, 12*c* and 12*d*). In the present embodiment, the electrode 11, the piezoelectric film 13, and the electrode 12 are collectively referred to as a stacked body (for example, stacked bodies 30*a* and 30*d*).

The stacked body 30*d*, which is the end 51 of the piezoelectric element 50, is closest to the film support portion 17 and is arranged on the film support portion 17 side from the inflection point of the vibration film 16. In addition, the stacked body 30*a* is the stacked body farthest from the stacked body 30*d* and is arranged in the center of the vibration film 16 in the present embodiment. When the vibration film 16 has an approximately circular shape, the stacked body 30*a* has an approximately circular structure, and the stacked bodies other than the stacked body 30*a* (for example, stacked body 30*d*) have an annular structure. In other words, the stacked body 30*a* is surrounded by the stacked bodies other than stacked body 30*a* (for example, the stacked body 30*d*).

Each of the stacked bodies is separated from each other. That is, the upper electrodes are separated from each other, the piezoelectric films are separated from each other, and the lower electrodes are separated from each other. In addition, the stacked body 30*d*, which is the end 51 of the piezoelectric element 50, has a region (In FIG. 3 and FIG. 4, overlapped as viewed from the direction normal to the vibration film 16) that is closest to the film support portion 17. In FIGS. 3 and 4, the four stacked bodies are illustrated, and the number of stacked bodies is not limited to four, and may be two or more. For example, two, three or five stacked bodies may be included in the piezoelectric element. In addition, the end 51 of the piezoelectric element 50 and the film support portion 17 need not overlap each other when viewed from the direction normal to the vibration film 16 as long as the above effect is not inhibited.

The respective electrodes 11 and respective electrodes 12 are independently and electrically connected to the electrode pad via wiring. Specifically, the upper electrode 11*a* is electrically connected to the electrode pad 21*a*, the upper electrode 11*b* is electrically connected to the electrode pad 21*b*, the upper electrode 11*c* is electrically connected to the electrode pad 21*c*, the upper electrode 11*d* is electrically connected to the electrode pad 21*d*, the lower electrode 12*a* is electrically connected to the electrode pad 22*a*, the lower electrode 12*b* is electrically connected to the electrode pad 22*b*, the lower electrode 12*c* is electrically connected to the electrode pad 22*c*, and the lower electrode 12*d* is electrically connected to the electrode pad 22*d*. The wiring is routed and arranged symmetrically with respect to the center of gravity of the vibration film 16. In the present specification, the term "electrically connected" includes being connected through "something having some sort of electrical action". Here, "something having some sort of electrical action" is not particularly limited as long as it enables the transmission and reception of electrical signals between the connection objects. For example, "something having some sort of electrical action" includes electrodes, wiring, switching elements, resistive elements, inductors, capacitive elements, and the other elements having various functions.

When a driving voltage is applied to each of the electrode 11 and the electrode 12, a potential difference is generated between the electrode 11 and the electrode 12. The vibration film 16 is displaced by this potential difference.

By repeatedly applying a driving voltage to the electrode 11 and the electrode 12, the vibration film 16 alternately repeats upward displacement and downward displacement. The air around the vibration film 16 is vibrated by the vibration of the vibration film 16, and the vibration of the air is output as a sound wave.

In the present embodiment, the piezoelectric element 50 has a plurality of stacked bodies including the electrode 11 and the electrode 12, and a driving voltage is applied to each of the stacked bodies. In each of the stacked bodies, it is possible to change the physical characteristics such as the effective size and hardness of the vibration body including the piezoelectric element 50 and the vibration film 16 by suitably adjusting the driving voltage, thereby making it possible to change the resonant frequency (natural frequency) of the vibration body.

Specifically, the piezoelectric element 50 applies a waveform voltage to the stacked body 30*a* and applies a control voltage to the stacked body 30*d*, or opens the upper electrode 11*d* of the stacked body 30*d*, and applies a control voltage or a waveform voltage to the remaining stacked bodies independently, or opens the upper electrode of the stacked body. The control voltage can be, for example, 0 V or any voltage. The waveform voltage can be any desired waveform, for example, a sine wave of 0 to 5 V, a unipolar pulse, a bipolar pulse, a burst wave, a continuous wave, or the like. "Open the electrode" is to block the path of current flowing to the electrode.

In addition, the above example is not limited to the case where the piezoelectric element 50 opens the upper electrode. For example, the piezoelectric element 50 may open the lower electrode, or may open the upper electrode and the lower electrode.

As for the voltage to be applied to the electrode, the voltage modulated by a filter or the like can be used. For example, a voltage to be applied to one electrode is modulated, and the modulated voltage can be applied to the other electrode. This makes it possible to reduce the number of electrode pads and the type of driving voltage to be applied, thereby making the manufacturing process more convenient.

In addition, it is preferable that a control voltage is applied to all of the stacked bodies sandwiched between the stacked body 30*d* and the stacked body which has a control voltage applied thereto and which is closest to the stacked body 30*a*. This makes it possible to reduce the number of types of driving voltage to be applied, thereby making the manufacturing process more convenient.

This configuration makes it possible to provide a transducer capable of varying the resonant frequency of the vibration body. In addition, it is possible to increase the number of gradations of the resonant frequency of the vibration body as the number of the stacked bodies included in the piezoelectric element increases. For this reason, sound waves can be output using the resonant frequency of the vibration body which is more optimal at the reception side. In addition, by applying various voltages for a control voltage, an adjustment can also be made in a scanning operation that searches for an optimum value of the resonant frequency of the vibration body by continuously and gradually changing the control voltage.

The transducer according to the present embodiment is not limited to the configuration described above, and various modifications can be made. The modifications of the transducer according to the present embodiment will be described below.

<First Modification>

Figure 5:
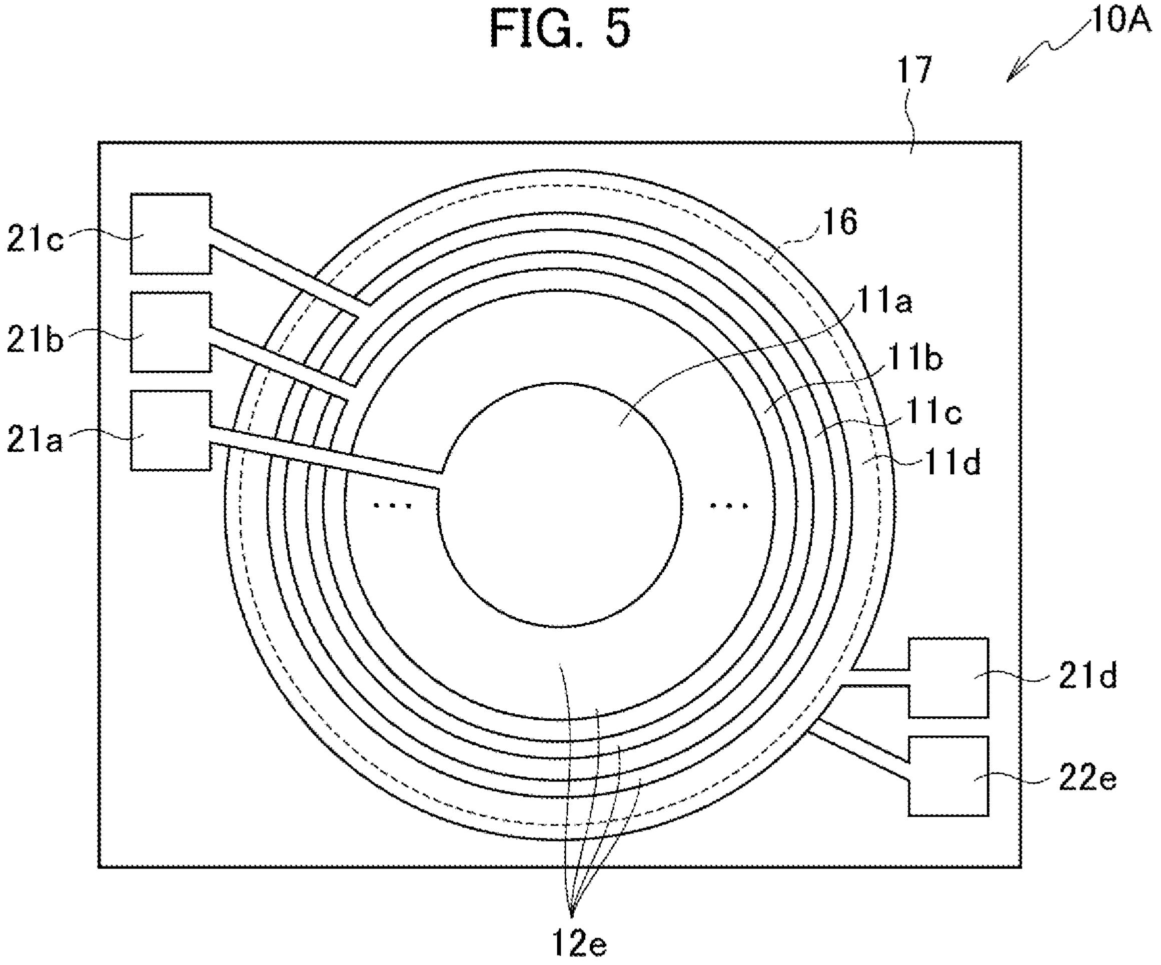
FIG. 5 is a top view of a transducer according to a first modification.
Figure 6:
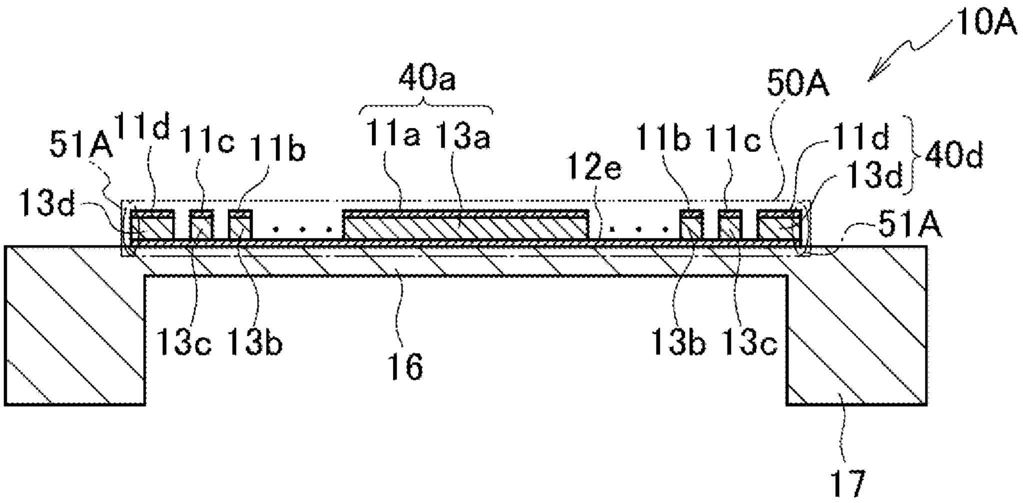
FIG. 6 is a cross-sectional view of the transducer according to the first modification.

The configuration of the transducer according to the present modification will be described with reference to FIG. 5 and FIG. 6. A transducer 10A in the present modification differs from the transducer 10 illustrated in FIG. 3 and FIG. 4 above in that a lower electrode 12*e* is used instead of the lower electrodes 12*a*, 12*b*, 12*c* and 12*d*. In the present modification, the points in common with the transducer 10 illustrated in FIG. 3 and FIG. 4 are described above, and the differences will be described below.

A piezoelectric element 50A includes a plurality of electrodes 11 (in the present modification, for example, the upper electrodes 11*a*, 11*b*, 11*c* and 11*d*), a plurality of piezoelectric films 13 (in the present modification, for example, the piezoelectric films 13*a*, 13*b*, 13*c* and 13*d*), and the lower electrode 12*e*. The lower electrode 12*e* can be made of the same material as the electrode 12. In the present modification, the electrode 11 and the piezoelectric film 13 are collectively referred to as a stacked body (for example, stacked bodies 40*a* and 40*d*).

The stacked body 40*d* is an end 51A of the piezoelectric element 50A and is arranged on the film support portion 17 side from the inflection point of the vibration film 16. In addition, the stacked body 40*a* is the stacked body farthest from the stacked body 40*d* and is arranged in the center of the vibration film 16 in the present modification. When the vibration film 16 has an approximately circular shape, the stacked body 40*a* has an approximately circular structure, and the stacked bodies other than the stacked body 40*a* (for example, the stacked body 40*d*) have an annular structure. In other words, the stacked body 40*a* is surrounded by the stacked bodies other than the stacked body 40*a* (for example, the stacked body 40*d*).

Each of the stacked bodies is separated from each other. That is, each of the upper electrodes is separated from each other, and each of the piezoelectric films is separated from each other. In addition, the stacked body 40*d*, which is the end 51A of the piezoelectric element 50A, has a region overlapping the film support portion 17 when viewed from the direction normal to the vibration film 16. In addition, the end 51A of the piezoelectric element 51 and the film support portion 17 need not overlap each other when viewed from the direction normal to the vibration film 16 as long as the above effect is not inhibited.

The respective electrodes 11 are independently electrically connected to the electrode pad via wiring. Specifically, the upper electrode 11*a* is electrically connected to the electrode pad 21*a*, the upper electrode 11*b* is electrically connected to the electrode pad 21*b*, the upper electrode 11*c* is electrically connected to the electrode pad 21*c*, the upper electrode 11*d* is electrically connected to the electrode pad 21*d*, and the lower electrode 12*e* is electrically connected to the electrode pad 22*e*. The wiring is routed and arranged symmetrically with respect to center of gravity of the vibration film 16.

With such a configuration, a potential difference is generated between the upper electrodes and the lower electrode 12*e* of the plurality of stacked bodies. The lower electrode 12*e* is paired with the respective upper electrodes of the plurality of stacked bodies, and the lower electrode 12*e* is shared in the respective pairs. Since the lower electrode 12*e* is shared as above, it is possible to reduce the number of electrode pads and the type of driving voltage to be applied, thereby making the manufacturing process more convenient.

<Second Modification>

Figure 7:
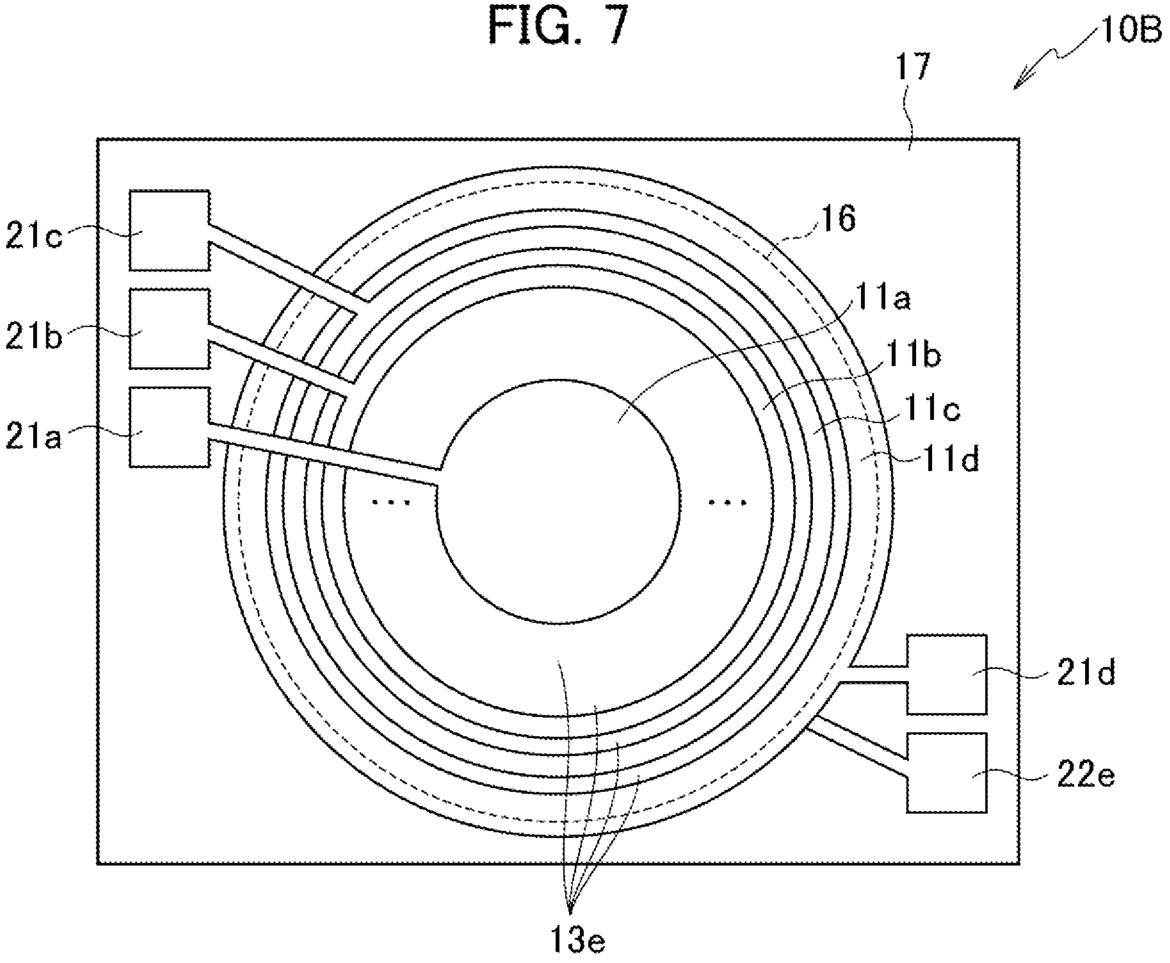
FIG. 7 is a top view of a transducer according to a second modification.
Figure 8:
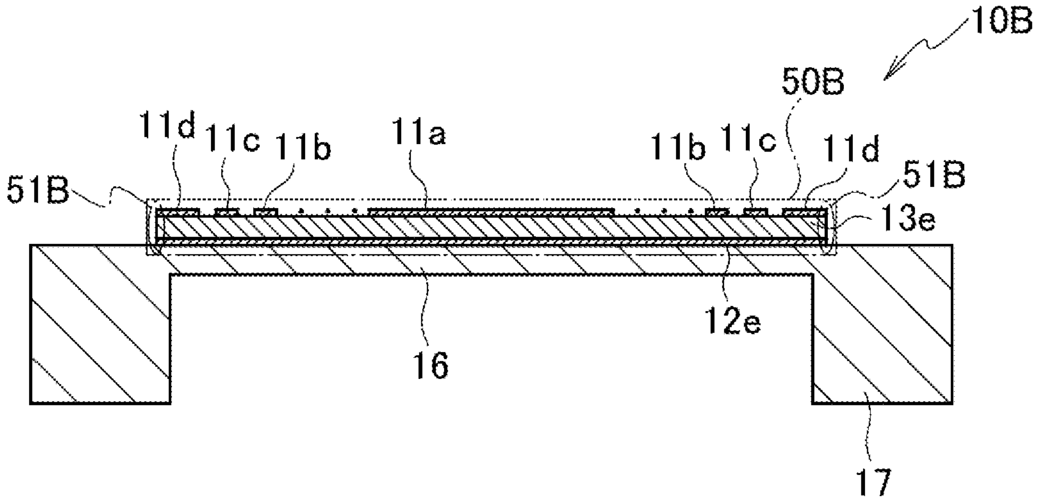
FIG. 8 is a cross-sectional view of the transducer according to the second modification.

The configuration of the transducer according to the present modification will be described with reference to FIG. 7 and FIG. 8. A transducer 10B in the present modification differs from the transducer 10A illustrated in FIG. 5 and FIG. 6 above in that a piezoelectric film 13*e* is used instead of the piezoelectric films 13*a*, 13*b*, 13*c* and 13*d*. In the present modification, the points in common with the transducer 10A illustrated in FIG. 5 and FIG. 6 are described above, and the differences will be described below.

A piezoelectric element 50B has a plurality of electrodes 11 (in the present modification, for example, the upper electrodes 11*a*, 11*b*, 11*c* and 11*d*), the piezoelectric film 13*e*, and the lower electrode 12*e*. The piezoelectric film 13*e* can be made of the same material as the piezoelectric film 13.

The upper electrode 11*d* is an end 51B of the piezoelectric element 50B and is arranged on the film support portion 17 side from the inflection point of the vibration film 16. In addition, the upper electrode 11*a* is the upper electrode farthest from the upper electrode 11*d* and is arranged in the center of the vibration film 16 in the present modification. When the vibration film 16 has an approximately circular shape, the upper electrode 11*a* has an approximately circular structure, and the upper electrodes other than the upper electrode 11*a* (for example, the upper electrode 11*d*) have an annular structure. In other words, the upper electrode 11*a* is surrounded by the upper electrodes other than the upper electrode 11*a* (for example, the upper electrode 11*d*).

Each of the upper electrodes is separated from each other. In addition, the upper electrode 11*d*, which is the end 51B of the piezoelectric element 50B, has a region overlapping the film support portion 17 when viewed from the direction normal to the vibration film 16.

With such a configuration, a potential difference is generated between the upper electrodes and the lower electrode 12*e*. The lower electrode 12*e* is paired with the respective upper electrodes, and the lower electrode 12*e* is shared in the respective pairs. Since the lower electrode 12*e* is shared as above, it is possible to reduce the number of electrode pads and the type of driving voltage to be applied, thereby making the manufacturing process more convenient.

As described above, although some modifications have been described, the statements and drawings that form part of the disclosure are exemplary and should not be understood as limiting. A variety of alternative modifications and operational techniques will become apparent to those skilled in the art from this disclosure.

Second Embodiment

The system according to the present embodiment will be described. The system according to the present embodiment includes the piezoelectric element described above, and the film body 15. The vibration body including the piezoelectric element described above and the film body 15 can vary the resonance frequency.

The system has a function of selecting the respective driving voltages to be applied to each of the electrode 11 and the electrode 12 of the piezoelectric element 50, and selecting the combination which is most efficient for external inputs (sound waves or the like). For example, in the piezoelectric element of the first embodiment, since the vibration body in which the electrode 11 and the electrode 12 each having a sine wave of 0 to 5 V applied thereto are stacked is vibrated by an external input, a signal (electrical signal) is generated between the electrode 11 and the electrode 12 due to the positive piezoelectric effect upon receiving the above vibration, and the signal is extracted. That is, the electrode 11 and the electrode 12 are used as a vibration sensor to sense the electrical signal. In general, a reception frequency with the highest sensitivity in a vibration sensor is the resonant frequency of a vibration body serving as a sensing device. The system makes it possible to put the vibration body in a more optimal state with the highest sensitivity for external input by adjusting the resonant frequency of the vibration body which is the vibration sensor.

As for a method of combining driving voltages (selection method), for example, the transmitter side information (e.g. transmission frequency, or the like) is input into the system by a user, and the control unit of the system selects the optimum combination. This selection makes it possible to put the vibration body in a more optimal state with the highest sensitivity.

This configuration makes it possible to provide a system which adjusts the resonant frequency of the vibration body such that the vibration body is in a more optimal state with the highest sensitivity for external input.

Other Embodiments

As described above, although some embodiments have been described, the statements and drawings that form part of the disclosure are exemplary and should not be understood as limiting. A variety of alternative embodiments, examples, and operational techniques will become apparent to those skilled in the art from this disclosure.

The invention claimed is:

1. A transducer comprising:

a piezoelectric element; and a film body including a film support portion having a hollow portion, and a vibration film connected to the film support portion and displaceable in a film thickness direction, the film body having the piezoelectric element stacked over the vibration film, wherein the piezoelectric element includes:

a first stacked body having a first pair of electrodes and a first piezoelectric filth sandwiched between the first pair of electrodes; and a second stacked body having a second pair of electrodes and a second piezoelectric film sandwiched between the second pair of electrodes, the second stacked body being separated from the first stacked body;

the piezoelectric element and the film body form a vibration body; and the first stacked body and the second stacked body each have a driving voltage applied thereto, and are configured to be driven individually by the driving voltages respectively applied thereto to thereby change a resonant frequency of the vibration body.

2. The transducer according to claim 1, wherein the piezoelectric element further includes a third stacked body having a third pair of electrodes and a third piezoelectric film sandwiched between the third pair of electrodes, and the third stacked body is sandwiched between the first stacked body and the second stacked body, and is separated from the first stacked body and the second stacked body.

3. The transducer according to claim 1, wherein an end of the second stacked body has a region overlapping the film support portion when viewed from a direction normal to the vibration film.

4. The transducer according to claim 1, wherein the first stacked body is surrounded by the second stacked body.

5. The transducer according to claim 1, wherein the vibration film has a double-sided beam shape.

6. A transducer comprising:

a piezoelectric element; and a film body including a film support portion having a hollow portion, and a vibration film connected to the film support portion and displaceable in a film thickness direction, the film body having the piezoelectric element stacked over the vibration film, wherein the piezoelectric element includes:

a first electrode;

a first stacked body having a first piezoelectric film and a second electrode; and a second stacked body having a second piezoelectric film and a third electrode, and separated from the first stacked body;

the first piezoelectric film is sandwiched between the first electrode and the second electrode;

the second piezoelectric film is sandwiched between the first electrode and the third electrode;

the piezoelectric element and the film body form a vibration body; and the first stacked body and the second stacked body each have a driving voltage applied thereto, and are configured to be driven individually by the driving voltages respectively applied thereto to thereby change a resonant frequency of the vibration body.

7. The transducer according to claim 6, wherein the first piezoelectric film and the second piezoelectric film are positioned over the first electrode.

8. The transducer according to claim 6, wherein the piezoelectric element further includes a third stacked body having a third piezoelectric film and a fourth electrode, and the third stacked body is sandwiched between the first stacked body and the second stacked body, and is separated from the first stacked body and the second stacked body.

9. The transducer according to claim 6, wherein an end of the second stacked body has a region overlapping the film support portion when viewed from a direction normal to the vibration film.

10. The transducer according to claim 6, wherein the first stacked body is surrounded by the second stacked body.

11. The transducer according to claim 6, wherein the vibration film has a double-sided beam shape.

12. A transducer comprising:

a piezoelectric element; and a film body including a film support portion having a hollow portion, and a vibration film connected to the film support portion and displaceable in a film thickness direction, the film body having the piezoelectric element stacked over the vibration film, wherein the piezoelectric element includes:

a first electrode;

a second electrode;

a piezoelectric film sandwiched between the first electrode and the second electrode; and a third electrode;

the piezoelectric film is sandwiched between the first electrode and the third electrode;

the third electrode is separated from the second electrode;

each of the second electrode and the third electrode has a driving voltage applied thereto;

the piezoelectric element and the film body form a vibration body; and the piezoelectric element is configured to change a resonant frequency of the vibration body by controlling the driving voltages applied to the second electrode and the third electrode individually.

13. The transducer according to claim 12, wherein an end of the third electrode has a region overlapping the film support portion when viewed from a direction normal to the vibration film.

14. The transducer according to claim 12, wherein the vibration film is positioned over the first electrode.

15. The transducer according to claim 12, wherein the piezoelectric element further includes a fourth electrode, the piezoelectric film is sandwiched between the first electrode and the fourth electrode, and the fourth electrode is sandwiched between the second electrode and the third electrode, and is separated from the second electrode and the third electrode.

16. The transducer according to claim 12, wherein the second electrode is surrounded by the third electrode.

17. The transducer according to claim 12, wherein the vibration film has a double-sided beam shape.

* * * * *